United States Patent
Ward et al.

(10) Patent No.: US 8,943,255 B2
(45) Date of Patent: Jan. 27, 2015

(54) METHODS AND STRUCTURE FOR ACCOUNTING FOR CONNECTION RESETS BETWEEN PERIPHERAL COMPONENT INTERCONNECT EXPRESS BRIDGES AND HOST DEVICES

(75) Inventors: Robert E. Ward, Colorado Springs, CO (US); Brian Lessard, Colorado Springs, CO (US); Terry Altmayer, Monument, CO (US)

(73) Assignee: LSI Corporation, Milpitas, CA (US)

( * ) Notice: Subject to any disclaimer, the term of this patent is extended or adjusted under 35 U.S.C. 154(b) by 386 days.

(21) Appl. No.: 13/482,693

(22) Filed: May 29, 2012

(65) Prior Publication Data

US 2013/0326106 A1    Dec. 5, 2013

(51) Int. Cl.
G06F 13/20    (2006.01)

(52) U.S. Cl.
USPC ......................................................... 710/313

(58) Field of Classification Search
CPC .................... G06F 13/4027; G06F 2213/0026; H04L 49/3009
USPC .................................................. 710/30, 306
See application file for complete search history.

(56) References Cited

U.S. PATENT DOCUMENTS

| | | | |
|---|---|---|---|
| 7,478,178 B2 * | 1/2009 | Torudbakken et al. | 710/31 |
| 7,565,463 B2 * | 7/2009 | Johnsen et al. | 710/30 |
| 7,802,049 B2 * | 9/2010 | Levy | 710/316 |
| 8,140,922 B2 * | 3/2012 | Haraden et al. | 714/724 |
| 8,171,242 B2 * | 5/2012 | Hong | 711/158 |
| 8,200,880 B2 * | 6/2012 | Higuchi et al. | 710/313 |
| 8,489,791 B2 * | 7/2013 | Byrne et al. | 710/306 |
| 8,533,379 B2 * | 9/2013 | Evoy et al. | 710/313 |
| 2007/0130397 A1 | 6/2007 | Tsu | |
| 2009/0204974 A1 * | 8/2009 | Feehrer | 719/314 |
| 2010/0005205 A1 | 1/2010 | Brune et al. | |
| 2011/0320653 A1 | 12/2011 | Lais et al. | |
| 2014/0112339 A1 * | 4/2014 | Safranek et al. | 370/389 |

* cited by examiner

Primary Examiner — Paul R Myers
(74) Attorney, Agent, or Firm — Duft Bornsen & Fettig LLP

(57) ABSTRACT

Methods and structure for accounting are provided for enhancing communications via a PCIE bridge. The bridge comprises a host interface that manages communications with a host device, and a PCIE interface that provides Memory Read Requests (MRds) to a PCIE device and receives Memory Read Completions (MRCs) from the PCIE device. The bridge also comprises a control unit that inserts tag information into the MRds. The control unit detects a reset of the host interface and revises the tag information inserted into the MRds responsive to detecting the reset. Additionally, the control unit analyzes tag information of received MRCs to determine whether it is the revised tag information or is old tag information, returns completion data from MRCs having the revised tag information to the host device, and discards completion data from received MRCs having the old tag information.

21 Claims, 3 Drawing Sheets

METHODS AND STRUCTURE FOR ACCOUNTING FOR CONNECTION RESETS BETWEEN PERIPHERAL COMPONENT INTERCONNECT EXPRESS BRIDGES AND HOST DEVICES

BACKGROUND

1. Field of the Invention

The invention relates generally to Peripheral Component Interconnect Express (PCIE) and more specifically relates to systems and methods used to address issues stemming from resets of connections between non-PCIE host devices and PCIE bridges in a PCIE environment.

2. Discussion of Related Art

PCIE is a set of standards that define rules for serialized communication between electronic devices. PCIE devices may be used for any number of purposes within an electronic system. However, many electronic systems include more than just PCIE devices (i.e., these other devices support communication protocols such as Serial Advanced Technology Attachment (SATA), Serial Attached SCSI (SAS), etc.). PCIE bridges are therefore often placed within an electronic system in order to facilitate communications between the PCIE and non-PCIE devices.

For example, a PCIE bridge may be used to carry communications between a SATA host and a PCIE storage controller managing one or more storage devices. The PCIE bridge may receive a SATA read request from a host, and may generate a corresponding PCIE Memory Read Request (MRd) for transmission to the storage controller. The PCIE bridge may then receive a PCIE Memory Read Completion (MRC) from the storage controller in reply to the MRd, and the MRC may include completion data (i.e., payload data) that was requested by the host. The completion data from the MRC is then provided to the host in a SATA-compatible communication for processing.

It is not uncommon for a SATA connection between a PCIE bridge and a host to be reset for any of a number of reasons. When the reset occurs, one or more MRCs may still be in the process of being generated for MRds that were sent out along the PCIE system before the reset. Unfortunately, once the connection has been reset, the host is unaware of the previous MRds that it triggered before the reset. Because of this, the host, upon receiving data for an MRC associated with an old MRd that was sent out prior to reset, may mistakenly assume that the data from the MRC corresponds to an MRd that was generated after the connection was reset. This means that the host will mistakenly assume that data received in response to an old request is actually for a new request, which is inaccurate. This in turn is likely to result in corruption of data on the system, which often is a fatal flaw in storage system environments that place a premium on data integrity.

As presently practiced in the art, PCIE requires that an idle period of about 160 milliseconds (ms) be implemented along a recently reset communication channel in order for any pending MRCs to clear out of the system. From this point forward, the system assumes that no MRCs are still being processed that relate to MRds sent before the connection was reset. However, this solution results in a number of problems. First, delaying processing for 160 ms along a communication channel with the host adds a substantial amount of latency to the system, and leaves processing resources idle that could otherwise be used to carry data between various components of the system. Second, even a delay as long as 160 ms does not guarantee that all MRCs relating to old MRds will be discarded by the system. If data from an MRC takes longer than 160 ms to get back to the host device, it will still interfere with processing on the system and remains likely to cause data corruption.

Thus it is an ongoing challenge to account for connection resets between PCIE bridges and non-PCIE host devices in an electronic system.

SUMMARY

The present invention addresses the above and other problems, thereby advancing the state of the useful arts in the field of Peripheral Component Interconnect Express (PCIE), by providing methods and structure for using a PCIE bridge to add tag information to Memory Read Requests (MRds). The tags applied to the MRds are revised each time a communication interface between the bridge and a host is reset. Thus, any received Memory Read Completions (MRCs) that use the old, unaltered tag information are known to relate to old MRds that occurred prior to reset of the host interface, and may be discarded. At the same time, information from MRCs that include the new revised tag information may be passed to the host for processing without delay.

In one aspect hereof, a method is provided for managing operations of a Peripheral Component Interconnect Express (PCIE) bridge. The method comprises operating a host interface of the PCIE bridge to manage communications with a host device, and operating a PCIE interface of the PCIE bridge to provide Memory Read Requests (MRds) to a PCIE device and to receive Memory Read Completions (MRCs) from the PCIE device that correspond to the MRds. The method further comprises inserting tag information into the MRds, and detecting a reset of the host interface. Further, the method includes revising the tag information inserted into the MRds responsive to detecting the reset of the host interface, and analyzing tag information of received MRCs to determine whether it is the revised tag information or is old tag information. The method also comprises returning completion data from MRCs having the revised tag information to the host device, and discarding completion data from received MRCs having the old tag information.

Another aspect hereof provides a Peripheral Component Interconnect Express (PCIE) bridge. The bridge comprises a host interface operable to manage communications with a host device, and a PCIE interface operable to provide Memory Read Requests (MRds) to a PCIE device and to receive Memory Read Completions (MRCs) from the PCIE device that correspond to the MRds. The PCIE bridge also comprises a control unit operable to insert tag information into the MRds. The control unit is further operable to detect a reset of the host interface and to revise the tag information inserted into the MRds responsive to detecting the reset of the host interface. Additionally, the control unit is operable to analyze tag information of received MRCs to determine whether it is the revised tag information or is old tag information, to return completion data from MRCs having the revised tag information to the host device, and to discard completion data from received MRCs having the old tag information.

DETAILED DESCRIPTION OF THE DRAWINGS

Figure 1:
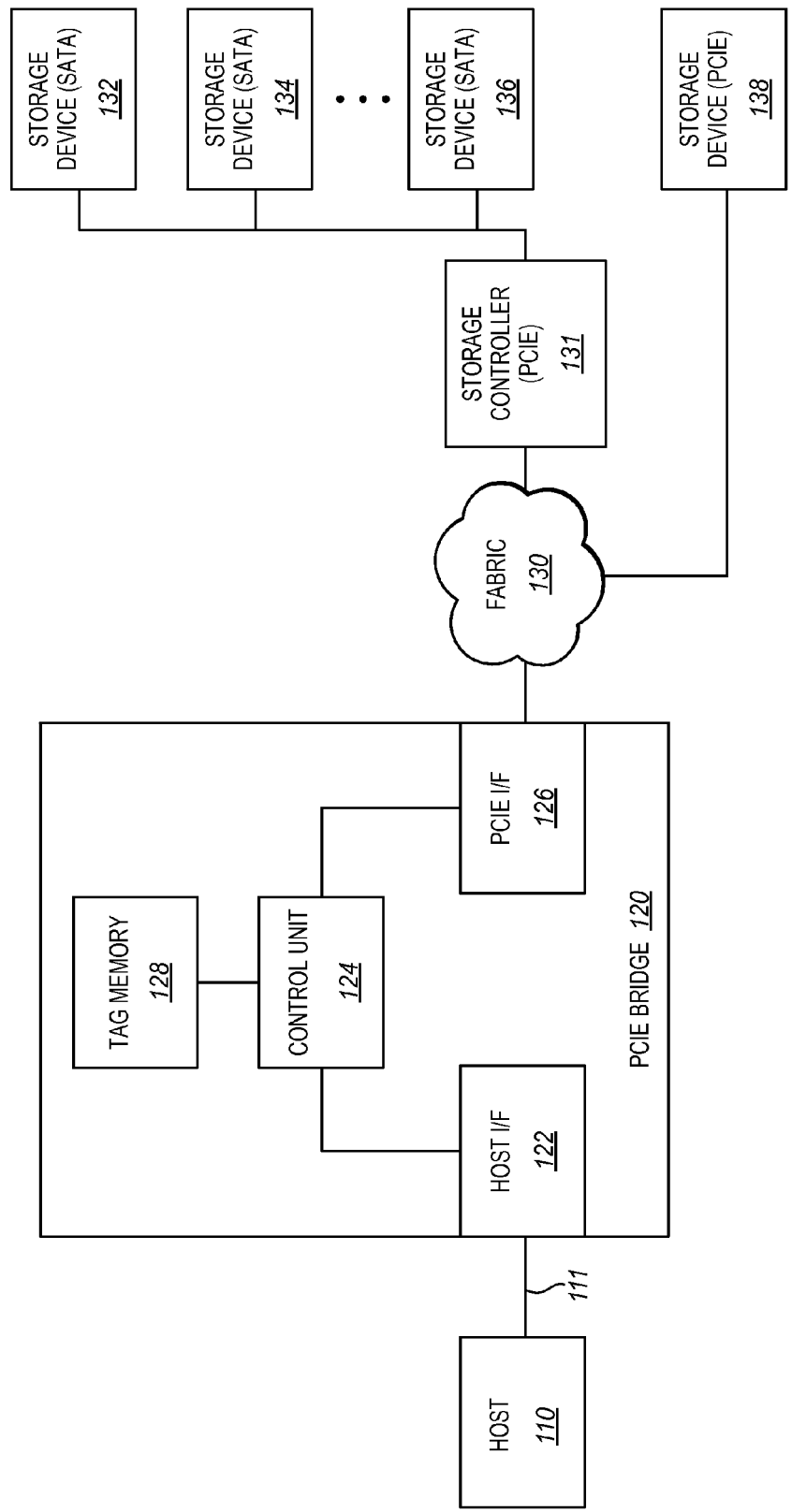
FIG. 1 is a block diagram of an exemplary PCIE bridge facilitating communications between a host and various storage devices in accordance with features and aspects hereof.

FIG. 1 is a block diagram of an exemplary Peripheral Component Interconnect Express (PCIE) bridge 120 facilitating communications between a non-PCIE host 110 and various storage devices 132-138 in accordance with features and aspects hereof. Utilizing PCIE bridge 120, the tag information used in newly generated Memory Read Requests (MRds) is revised each time host interface 122 is reset. Because each Memory Read Completion (MRC) uses header data that corresponds to an MRd, any MRCs received at the PCIE bridge that utilize the old tag information may be discarded. Such MRCs relate to MRds from host 110 that are no longer valid. Thus, communications with host 110 may be immediately resumed after host interface 122 is reset (e.g., in the next clock cycle), because no delay is necessary in order to flush old Memory Read Completions (MRCs) from the system.

Host 110 comprises any suitable system capable of performing processing operations to access stored data. For example, host 110 may comprise a computing system/server, a storage controller, or other electronic device. Host 110 is communicatively coupled with host interface 122 via a non-PCIE communication channel 111, and may provide various input and output requests directed to PCIE devices 131 and 138. An example of a host input request is a request to retrieve data from a logical volume provisioned by storage devices 132-136.

PCIE bridge 120 comprises any system, device or component operable to bridge communications between PCIE and a protocol supported by host 110. In this embodiment, PCIE bridge 120 comprises host interface (I/F) 122, control unit 124, PCIE interface (I/F) 126, and memory 128.

Host I/F 122 comprises circuitry and components operable to manage communications between host 110 and PCIE bridge 120 that are performed according to the non-PCIE protocol supported by host 110. In one embodiment, host I/F 122 utilizes a differential signaling pathway to transmit and receive serial communications. For example, a protocol used by host I/F 122 may be compliant with standards for Serial Attached SCSI (SAS), Serial Advanced Technology Attachment (SATA), etc.

Control unit 124 comprises any system, component, or device operable to manage the operations of PCIE bridge 120. Such operations may include generating PCIE commands based on received data from host 110 (e.g., translating, packaging, or wrapping incoming commands and data from host 110 into MRds so that they may be sent along a PCIE hierarchy). Control unit 124 may be implemented, for example, as custom circuitry, as a special or general purpose processor executing programmed instructions stored in an associated program memory, or some combination thereof.

PCIE I/F 126 comprises hardware and associated logic for managing communications with a PCIE device (e.g., via fabric 130) in accordance with PCIE standards. For example, the behavior of PCIE I/F 126 may be governed by the PCI Express Base Specification Revision 3.0, issued on Nov. 10, 2010 by the Peripheral Component Interconnect Special Interest Group, which is herein incorporated by reference.

Tag memory 128 comprises any system, component, or device operable to store data. For example, tag memory 128 may comprise a flash memory element, one or more hardware registers, a magnetic or optical recording medium, Random Access Memory (RAM), or other storage components. Tag memory 128 may include information indicating the current tag information used to generate MRds, may include old tag information that was previously used for MRds, etc.

Fabric 130 comprises any suitable combination of communication channels and devices operable to route communications according to PCIE standards. In some embodiments, fabric 130 may comprise a single PCIE switch. However, typically a number of interconnected point to point PCIE links will form fabric 130.

Bridge 120 is coupled with one or more PCIE devices 131 and 138. PCIE device 131 comprises a storage controller that is in turn coupled with one or more storage devices 132-136. PCIE device 138 comprises a storage device or PCIE endpoint that stores configuration data which host 110 may attempt to retrieve. Storage devices 132-138 may comprise magnetic hard disks, solid state drives, optical media, and/or other components.

Note that the particular arrangement of components described herein is merely intended to be exemplary, and one of ordinary skill in the art will appreciate that the specific arrangement and configuration of devices is merely a matter of design choice.

While in operation, PCIE bridge 120 receives host requests to read data from one or more of storage devices 132-138. Based upon these host requests, PCIE bridge 120 generates one or more MRds which are sent out to storage devices 132-138 via switched fabric 130. The MRds each include tag information that can be used for validation of incoming MRCs, and this tag information may be defined in memory 128. Typically, when no resets have occurred, the tag information for each generated MRd will be the same, although different tag information for MRds may be allowed in circumstances where the MRds share a common characteristic (e.g., MRds for the same host may share the same tag information, etc.).

MRCs are generated at a PCIE device based on received MRds. Each MRC includes header data that corresponds to the MRd that triggered the MRC (i.e., the tag information of the MRC may exactly match that of the corresponding MRd). Each MRC further typically includes completion data (i.e., payload data). Completion data either carries information requested by host 110, or indicates that an error has been encountered in processing the host request. PCIE bridge 120 then receives the MRCs that correspond to the MRds which have been sent out.

If host I/F 122 is reset at any point during this process, then control unit 124 can modify/revise the tag information used to generate each MRd. Thus, MRCs received at PCIE bridge 120 for old MRds will utilize tag information that is no longer valid. Control unit 124 may review the tag information of each received MRC to determine whether the tag information is valid, and may then discard any MRCs that utilize old, outdated tag information that does not match the new, updated tag information.

Thus, using the system of FIG. 1, whenever host I/F 122 is reset, there is no need to halt communications along host I/F 122 for a lengthy period. Instead, communications can be instantly resumed following a reset on host I/F 122. Thus, PCIE bridge 120 can selectively forward completion data from the MRCs that are relevant while discarding older MRCs relating to old, aborted operations.

Figure 2:
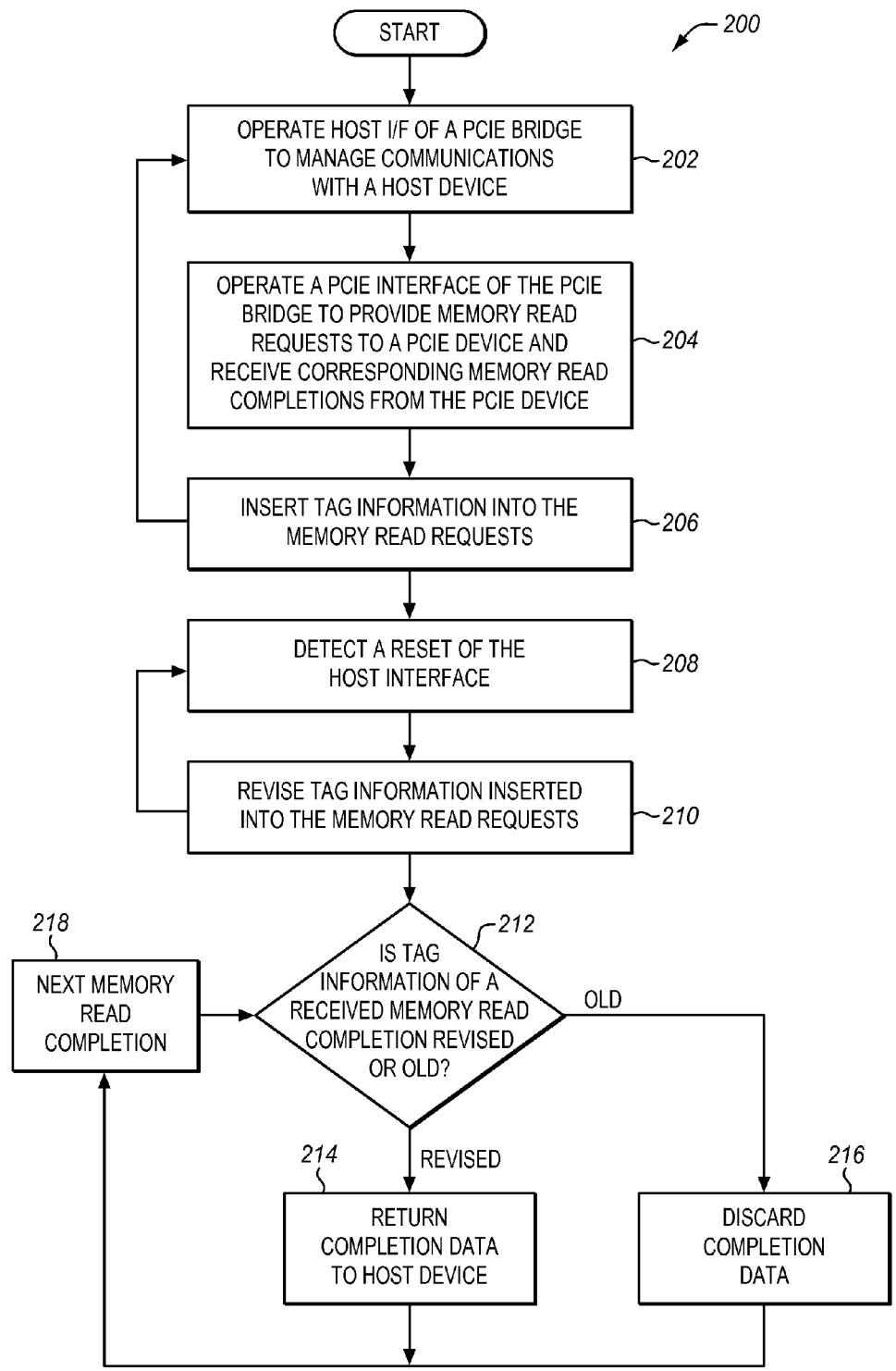
FIG. 2 is a flowchart describing an exemplary method in accordance with features and aspects hereof to alter tag information associated with MRCs and MRds each time a host interface is reset.

FIG. 2 is a flowchart describing an exemplary method 200 in accordance with features and aspects hereof to alter tag information associated with MRCs and MRds each time a host interface is reset. The method of FIG. 2 may be operable in a system such as described above with regard to FIG. 1. For example, control unit 124 of PCIE bridge 120 may implement the method described below.

Step 202 comprises operating a host interface of a PCIE bridge in order to manage communications with a host device. This process may typically involve receiving read and/or write requests from the host that utilize a non-PCIE communication medium and protocol, and generating corresponding PCIE-compliant communications for transmission to various PCIE endpoints. Typically, operating the host interface also includes receiving communications at a PCIE interface of the PCIE bridge, and generating corresponding communications for return to the host in accordance with its non-PCIE protocol (e.g., SAS, SATA, etc.).

Step 204 comprises operating the PCIE interface of the PCIE bridge in order to provide Memory Read Requests (MRds) to a PCIE device and to receive corresponding Memory Read Completions (MRCs) from the PCIE device. During this stage of operation, in step 206 tag information is inserted into the MRds which are transmitted to the PCIE device. For example, a current value for tag information stored in a memory of the PCIE bridge may be placed into generated MRds for transmission to downstream PCIE devices. The downstream PCIE devices (e.g., storage controllers, storage devices, and/or other devices) that receive an MRd may then generate a corresponding MRC upon completing the requested memory read. The MRC includes tag information corresponding to the tag information included in the MRd.

Step 208 comprises detecting a reset of the host interface. Steps 208 and 210 may be performed asynchronously and/or in parallel with steps 202-206 described above. A reset is any hardware event that results in a shut-down and/or re-initialization of communications between the host and the PCIE bridge. Examples of reset conditions may include a COMINIT signal used to re-initialize communications in SATA, initiation of a SAS speed negotiation, a SATA link reset signal, a cable break, a power surge, and others.

At step 210, a control unit of the PCIE bridge revises tag information that is inserted into the MRds. Revising the tag information may comprise incrementing or decrementing a number in the tag information, may comprise utilizing a different encoding scheme to generate tag information (e.g., by incrementing an index in the tag information, adjusting the tag information based upon the time that the reset occurred, etc.), or other techniques. Typically, the tag information will be the same for all MRds that have been generated in between detected resets. If the tag information used for each MRd is stored in memory, the control unit may alter the memory accordingly.

Thus, new MRds that are sent out by the PCIE bridge utilize the new tag information, and this tag information will be duplicated in headers of MRCs that respond to the new MRds. In contrast, old MRds generated before the reset will utilize old tag information. Because of this, headers of MRCs that are generated in response to the old MRds will include the old tag information.

At step 212, the PCIE bridge analyzes received MRCs to determine if their tag information is the old (i.e., unaltered) version or the revised (i.e., new) version. If the tag information is the old, unaltered version, then the MRC may be discarded in step 216, to avoid the host mistakenly assuming that completion data from the MRC applies to a new MRd, and not an old MRd that was sent out before the host interface was reset. However, if the tag information is the current revised version, completion data from the MRC may be sent onward to the host in step 214. The host may then process this data for its intended purpose.

At step 218, the PCIE bridge waits to receive a next MRC, and analyzes it in step 212. In some embodiments, this iterative analysis and processing continues on ad infinitum until the host interface encounters another reset. However, in some embodiments, the analysis of tag information in received MRCs only applies to the MRCs received a certain period of time after the reset occurs (e.g., 160 ms, one full second, etc.). If the PCIE bridge utilizes a general purpose processor, halting analysis after a time period may help to ensure that internal processing resources of the processor are efficiently utilized. Alternatively, if the PCIE bridge uses a custom circuit to perform MRd analysis, halting operations of the circuitry that performs the analysis may save power. Steps 212 through 216 may be performed asynchronously and/or in parallel with steps 202-206, or steps 208-210 described above.

Thus, using method 200 of FIG. 2, processing at a host interface may resume immediately after the host interface is reset (e.g., the next clock cycle after the reset is completed). This provides a substantial benefit over prior systems, which required a significant delay in processing.

Figure 3:
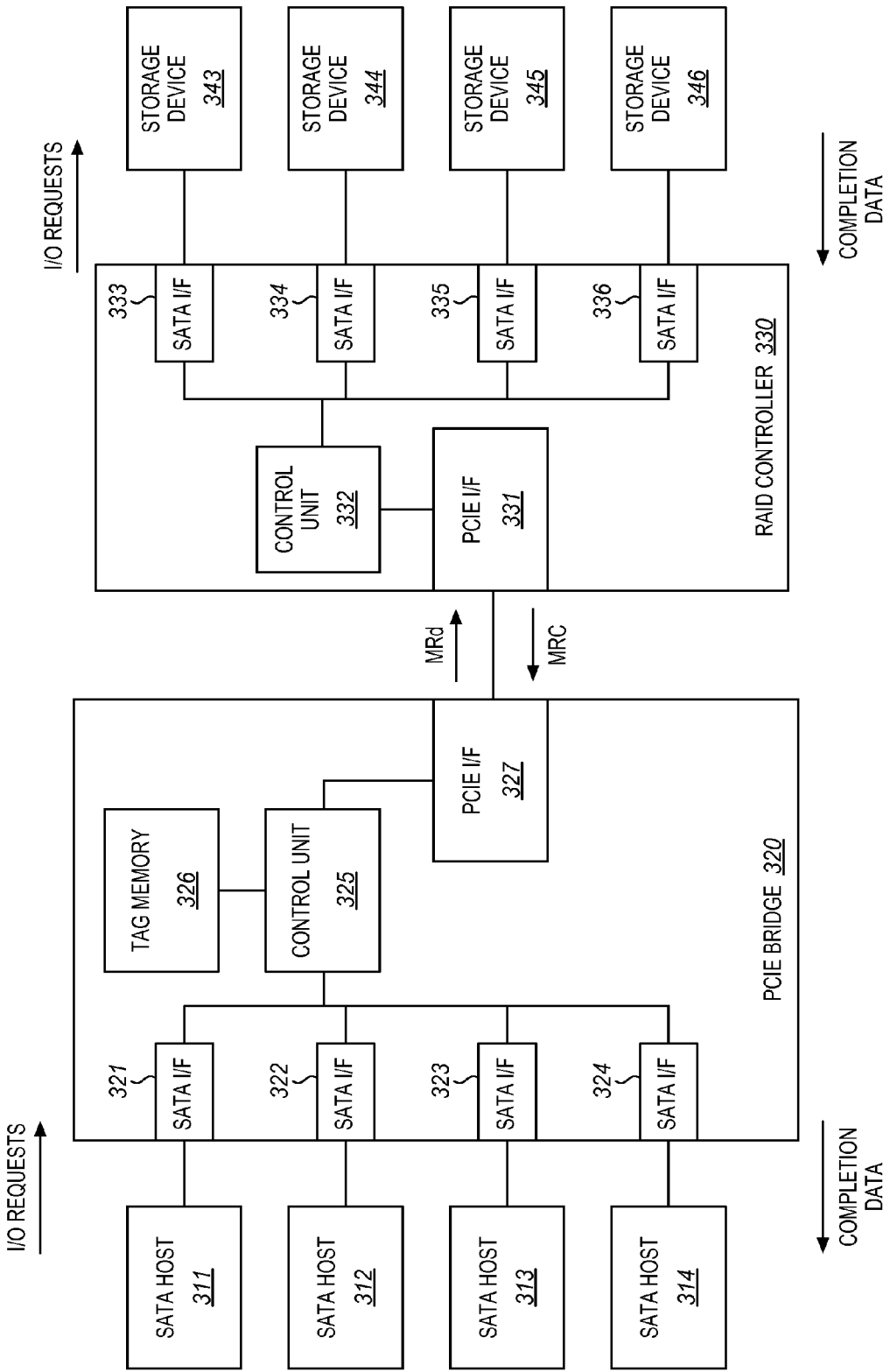
FIG. 3 is a block diagram illustrating an exemplary PCIE bridge facilitating communications between a SATA host and a PCIE storage controller in accordance with features and aspects hereof.

FIG. 3 is a block diagram illustrating an exemplary PCIE bridge 320 facilitating communications between a SATA host and a PCIE storage controller 330 in accordance with features and aspects hereof. According to FIG. 3, PCIE bridge 320 serves as a PCIE endpoint, and is utilized to facilitate communications between various SATA hosts 311-314 and storage controller 330. Specifically, PCIE bridge 320 receives a number of host Input/Output (I/O) requests at SATA interfaces 321-324, each SATA interface being dedicated to a SATA host. Control unit 325 receives the requests from SATA interfaces 321-324, and generates Memory Read Requests (MRds) based on the received host requests. For example, one MRd may correlate to one host read request, a portion of a host read request, or several host read requests directed to the same storage device. When control unit 325 generates an MRd, it reviews memory 326, which in this exemplary embodiment comprises a series of registers. Some of the registers indicate tag values to be placed in a portion of a header of generated MRds (e.g., a byte of header data that is specifically reserved under PCIE standards for tag information). Memory 326 may provide a separate set of registers to store the tag value for each SATA host. Thus, while the tag values for each host may be the same, the tag value for one host can be altered without altering the tag values for other hosts.

Control unit 325 utilizes PCIE I/F 327 to transmit the generated MRds, and awaits receipt of incoming Memory Read Completions (MRCs) that correspond to the MRds. Redundant Array of Independent Disks (RAID) controller 330 receives the MRds at PCIE I/F 331. In this embodiment, RAID controller 330 serves as the root complex of the PCIE system. The received MRds are processed by control unit 332, which includes custom circuitry and associated logic for analyzing received MRds. Based upon the information in a received MRd, control unit 332 generates SATA input requests for one or more of storage devices 343-346, and utilizes SATA interfaces 333-336 to forward the various requests to the appropriate storage devices 343-346. The storage devices retrieve the requested data, and send it back along the SATA interfaces to RAID controller 330.

At this point, control unit 332 generates an MRC using the information from the MRd and the information received from the storage devices. Completion data of the MRC (i.e., the "payload" content that is relevant to a given SATA host) is built from the received data from one or more storage devices, while the header of the MRC is generated based on header data from the originally received MRd. The generated MRC is then sent back towards PCIE bridge 320, which forwards completion data from the MRC to the appropriate host. As well understood by those of ordinary skill in PCIE technology, the headers used for an MRd or MRC may include address information for the PCI endpoint that sent the communication, as well as for the PCI endpoint to which the communication is directed.

Thus, during normal operations, MRds and MRCs are generated and routed through the system of FIG. 3 between the appropriate SATA hosts and storage devices. However, at some point during operation, one of SATA I/Fs 321-324 may encounter a reset condition with an associated SATA host. Thus, the SATA host will be unable to distinguish completion data for requests generated before the reset from completion data for requests that were generated after the reset (this is because the SATA host has flushed the requests that occurred before the interface was reset). In order to address this issue, control unit 325 alters the tag value stored in memory and associated with the reset host. In this manner, any new MRds that are generated by PCIE bridge 320 for the host will use the new tag value. Control unit 325 may then review MRCs that are directed to the host that has been reset, and may discard any MRCs that use the old tag values.

In a further embodiment, PCIE bridge 320 further includes a buffer used to store completion data for various MRCs that have been received from RAID controller 330. Control unit 325, responsive to detecting the reset of a host interface, reviews the buffer to find completion data associated with MRCs for the reset host that use the old tag values. This completion data is then discarded by control unit 325 before it is transmitted to the reset host.

In a further embodiment, control unit 325, responsive to detecting the reset of a host interface, checks the host interface that has been reset to determine if it is sending completion data to the reset host. If so, control unit 325 checks the tag value of the MRC associated with the completion data being transmitted. If the tag value is outdated or otherwise does not match the current data, control unit 325 halts transmission of the completion data midstream. This is performed to force a transmission error along the host interface, which is preferable to causing the host to mistakenly determine that the invalid data is actually valid.

In a further embodiment, PCIE bridge 320 further includes a buffer used to store request data for various MRds that have been received from the host. Control unit 325, responsive to detecting the reset of a host interface, reviews the buffer to find read requests associated with MRds for the reset host that use the old tag values. These requests are then discarded by control unit 325 before they are transmitted to RAID controller 330.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A Peripheral Component Interconnect Express (PCIE) bridge, comprising:
   a host interface operable to manage communications with a host device;
   a PCIE interface operable to provide Memory Read Requests (MRds) to a PCIE device and to receive Memory Read Completions (MRCs) from the PCIE device that correspond to the MRds; and
   a control unit operable to insert tag information into the MRds, wherein multiple outstanding MRds that have not yet been completed via an MRC include the same tag information,
   the control unit being further operable to detect a reset of the host interface, to revise the tag information inserted into MRds responsive to detecting the reset of the host interface, to analyze tag information of received MRCs to determine whether it is the revised tag information or is old tag information, to return completion data from MRCs having the revised tag information to the host device, and to discard completion data from received MRCs having the old tag information.

2. The PCIE bridge of claim 1, wherein:
   the control unit is further operable to insert the tag information into headers of the MRds, and is further operable to analyze tag information from headers of received MRCs.

3. The PCIE bridge of claim 2, wherein:
   the tag information is inserted into portions of the headers of the MRds that are reserved for tag information.

4. The PCIE bridge of claim 1 further comprising:
   a memory operable to buffer completion data from received MRCs for transmission to the host device, wherein:
   the control unit, responsive to detecting the reset of the host interface, is further operable to analyze tag information of MRCs that have completion data buffered in the memory to determine whether it is the revised tag information or the old tag information, and is further operable to remove buffered completion data from the memory that corresponds to MRCs that have the old tag information.

5. The PCIE bridge of claim 1 wherein:
   the control unit, responsive to detecting the reset of the host interface, is further operable to analyze tag information of MRCs that have completion data currently being transmitted by the host interface to determine whether it is the revised tag information or the old tag information, and is further operable to halt transmission of the completion data if a corresponding MRC has the old tag information.

6. The PCIE bridge of claim 1 further comprising:
   multiple host interfaces, each host interface operable to manage communications with a different host device; wherein
   the control unit is further operable to analyze completion data intended for transmission via the host interface that has been reset without interfering with processing of completion data intended for transmission via other host interfaces.

7. The PCIE bridge of claim 1 wherein:
   the host interface is a Serial Advanced Technology Attachment (SATA) interface.

8. A method for managing operations of a Peripheral Component Interconnect Express (PCIE) bridge, the method comprising:

operating a host interface of the PCIE bridge to manage communications with a host device;
operating a PCIE interface of the PCIE bridge to provide Memory Read Requests (MRds) to a PCIE device and to receive Memory Read Completions (MRCs) from the PCIE device that correspond to the MRds;
inserting tag information into the MRds, wherein multiple outstanding MRds that have not yet been completed via an MRC include the same tag information;
detecting a reset of the host interface;
revising the tag information inserted into MRds responsive to detecting the reset of the host interface;
analyzing tag information of received MRCs to determine whether it is the revised tag information or is old tag information;
returning completion data from MRCs having the revised tag information to the host device; and
discarding completion data from received MRCs having the old tag information.

9. The method of claim 8 wherein:
inserting the tag information comprises placing the tag information into headers of the MRds;
analyzing the tag information comprises reviewing headers of received MRCs.

10. The method of claim 9 wherein:
inserting the tag information comprises placing the tag information into portions of the headers of the MRds that are reserved for tag information.

11. The method of claim 8 further comprising:
buffering completion data from received MRCs for transmission to the host device; and
responsive to detecting the reset of the host interface:
analyzing tag information of MRCs that have completion data buffered in the memory to determine whether it is the revised tag information or the old tag information; and
removing buffered completion data from the memory that corresponds to MRCs that have the old tag information.

12. The method of claim 8 further comprising:
responsive to detecting the reset of the host interface:
analyzing tag information of MRCs that have completion data currently being transmitted by the host interface to determine whether it is the revised tag information or the old tag information; and
halting transmission of the completion data if a corresponding MRC has the old tag information.

13. The method of claim 8 further comprising:
managing communications with multiple a different host devices via multiple host interfaces; wherein
analyzing completion data intended for transmission via the host interface that has been reset does not comprise processing completion data intended for transmission via other host interfaces.

14. The method of claim 8 wherein:
the host interface is a Serial Advanced Technology Attachment (SATA) interface.

15. A non-transitory computer readable medium embodying programmed instructions which, when executed by a processor, are operable for performing a method comprising:
operating a host interface of the PCIE bridge to manage communications with a host device;
operating a PCIE interface of the PCIE bridge to provide Memory Read Requests (MRds) to a PCIE device and to receive Memory Read Completions (MRCs) from the PCIE device that correspond to the MRds;
inserting tag information into the MRds, wherein multiple outstanding MRds that have not yet been completed via an MRC include the same tag information;
detecting a reset of the host interface;
revising the tag information inserted into MRds responsive to detecting the reset of the host interface;
analyzing tag information of received MRCs to determine whether it is the revised tag information or is old tag information;
returning completion data from MRCs having the revised tag information to the host device; and
discarding completion data from received MRCs having the old tag information.

16. The medium of claim 15 wherein the method further comprises:
inserting the tag information comprises placing the tag information into headers of the MRds;
analyzing the tag information comprises reviewing headers of received MRCs.

17. The medium of claim 16 wherein the method further comprises:
inserting the tag information comprises placing the tag information into portions of the headers of the MRds that are reserved for tag information.

18. The medium of claim 15 wherein the method further comprises:
buffering completion data from received MRCs for transmission to the host device; and
responsive to detecting the reset of the host interface:
analyzing tag information of MRCs that have completion data buffered in the memory to determine whether it is the revised tag information or the old tag information; and
removing buffered completion data from the memory that corresponds to MRCs that have the old tag information.

19. The medium of claim 15 wherein the method further comprises:
responsive to detecting the reset of the host interface:
analyzing tag information of MRCs that have completion data currently being transmitted by the host interface to determine whether it is the revised tag information or the old tag information; and
halting transmission of the completion data if a corresponding MRC has the old tag information.

20. The medium of claim 15 wherein the method further comprises:
managing communications with multiple a different host devices via multiple host interfaces; wherein
analyzing completion data intended for transmission via the host interface that has been reset does not comprise processing completion data intended for transmission via other host interfaces.

21. A Peripheral Component Interconnect Express (PCIE) bridge, comprising:
an interface operable to establish a connection for communicating with a host; and
a control unit operable to detect a reset of the connection, to identify a Memory Read Completion (MRC) that includes completion data for the host, to identify a tag in the MRC, to determine based on the tag whether or not the MRC corresponds with a request from before the detected reset or after the detected reset, to discard the completion data if the MRC corresponds with a request from before the detected reset, and to return the completion data to the host if the MRC corresponds with a request from after the detected reset.

* * * * *